(12) United States Patent
Kim

(10) Patent No.: US 6,879,780 B2
(45) Date of Patent: Apr. 12, 2005

(54) METHOD AND DEVICE OF INSERTING A COATED ELECTRIC HEATING WIRE INTO A HOT WATER TUBE AND A SEALING APPARATUS FOR THE OPEN END(S) THEREOF

(76) Inventor: Du Nyun Kim, 687-1, Pungdeokchein-ri, Suji-eup, Yongin-si, Gyeonggi-do (KR), 449-846

( * ) Notice: Subject to any disclaimer, the term of this patent is extended or adjusted under 35 U.S.C. 154(b) by 0 days.

(21) Appl. No.: 10/866,192

(22) Filed: Jun. 14, 2004

(65) Prior Publication Data

US 2005/0013598 A1 Jan. 20, 2005

(30) Foreign Application Priority Data

Jun. 11, 2003 (KR) ................................ 20-2003-0018325
Jun. 11, 2003 (KR) ................................ 10-2003-0037661

(51) Int. Cl.$^7$ ................................................. F24H 1/10
(52) U.S. Cl. ...................................... 392/488; 392/485
(58) Field of Search ................................. 392/485, 488, 392/465, 466, 497, 501

(56) References Cited

U.S. PATENT DOCUMENTS

| 2,705,874 A | * | 4/1955 | Binder et al. .................. 62/234 |
| 2,877,630 A | * | 3/1959 | Schultz ......................... 62/276 |
| 5,146,633 A | * | 9/1992 | Kim et al. ...................... 5/421 |
| 5,371,830 A | * | 12/1994 | Wachenheim ............... 392/487 |
| 5,832,179 A | * | 11/1998 | Kim et al. ................... 392/489 |
| 5,859,953 A | * | 1/1999 | Nickless ..................... 392/489 |
| 6,043,455 A | * | 3/2000 | Kurita ......................... 219/213 |

* cited by examiner

Primary Examiner—Thor Campbell
(74) Attorney, Agent, or Firm—James Creighton Wray; Meera P. Narasimhan

(57) ABSTRACT

The present invention relates to a method and device of inserting a coated electric heating wire (6) into a hot water tube (2) and to an apparatus for a sealing plug mounted at an end (1a) of said hot water tube (2). An end of a hot water tube (2), normally laid out in a zig-zag form under the floor of a room to be heated, is pipe-fitted to an outlet tube (3a) of a pump (3c) through a guide tube (2A). Said coated electric heating wire (6) is inserted through a guide hole (2h) with a 20~30 degree slant to the guide tube (2A) and is connected to a ball-type guide member (5). The ball-type guide member is inserted into said hot water tube (2) in such a way as to achieve effective sealing of the interior sectional area of said hot water tube, and then a 10~20 kg/cm$^2$ water pressure generated by the pump (3C) is applied in the direction of shaft center of the hot water tube to push forward the ball-type guide member (5) all the way up to the other end of the tube line, carrying with it the electric heating wire (6) through the inside of the long hot water tube (2). Using a sealing apparatus mounted at the end (1a) of the hot water tube (2) in which a power line (e1, e1') and an electric heating wire (6, 6a) are coupled inside the wire channel (1h'), a sealing plug (1) in which a coated power line is placed is inserted into a plug (2) connecting the hot water tube. Then a crown nut (4) and a cap (5d) are connected and a temperature sensor (2S) is attached to a side of the hot water tube, the end (1a) of which is sealed with the sealing plug (1) so that electric power can be supplied to the electric heating wire (6, 6a) through the power line (e1, e1').

8 Claims, 4 Drawing Sheets

METHOD AND DEVICE OF INSERTING A COATED ELECTRIC HEATING WIRE INTO A HOT WATER TUBE AND A SEALING APPARATUS FOR THE OPEN END(S) THEREOF

This application claims the benefit of Korean Patent Application No. 10-2003-0037661 filed Jun. 11, 2003 and Korean Utility Model Application No. 20-2003-0018325 filed Jun. 11, 2003.

BACKGROUND OF THE INVENTION

Field of the Invention and Related Prior Art

The present invention relates to a method and a device of inserting an electric heating wire into a hot water tube and a sealing apparatus for the open end thereof.

Traditional hot water tube for domestic floor heating posed little problem for installation in case of a boiler-equipped system, but the lengthiness and zig-zag layout of the pipe line would cause a difficulty in inserting a coated electric heating wire into a hot water tube in a system where warming of floor is realized by heating a thermal medium within the tube without using a boiler.

A number of means have been known to tackle this problem, and in the case of a prior art related to the present invention, a utility model by the same applicant of the present application registered under the Korean Utility Model Registration No. 20-0148379, a coated copper wire was inserted into a hot water tube from an adapter directly connected to the hot water tube and the coated copper wire was pulled into and carried along inside the tube as a guiding plate attached with the coated copper wire was forced to move forward along the entire length inside the tube line by the pressure of water being supplied from a pump provided at a side of the adapter.

In this prior art, a plural number of funnel-shaped guiding plates were used so that the guiding plates may move under the water pressure, pulling along the coated copper wire toward the other end of the tube. But, the gap between the funnel-shaped guiding plate and the inner wall of the tube would increase depending on the position of the guiding plates in transit, resulting not only in a leakage of water pressure through the gaps and consequent poor utility rate of water pressure but also in frequent pauses of the coated copper wire movement somewhere inside the tube owing to a blocking at the bents (or curves) of the tube line. When the guiding plate came to a halt in the middle of its travel, it used to pose a complex situation in which water pressure supply had to be turned off and the coated copper wire already in the tube had to be retrieved to repeat the insertion process from the beginning.

The present invention is an improvement of said prior art. A sealing plug of the present invention is the core of a sealing apparatus through which an electric heating wire is inserted. This sealing plug is an improvement from the prior art by the same applicant of the present invention, Korean Utility Model Registration No. 20-0172037 (published 15 Mar. 2000), of the construction of a sealing apparatus for the end(s) of a hot water tube into which an electric heating wire is inserted.

In said prior art, a sealing plug is fitted into each end of the hot water tube in which a coated electric heating wire is inserted along the inside of the entire length of the tube, wherein the sealing plug in which a coated electric heating wire passes is attached to each end of the hot water tube, a cylinder-type cap is fastened, and a crown nut is tightened to press the sealing plug against the inner surface of the tube to tightly seal the open end of the hot water tube.

The sealing effect of the apparatus of the prior art above is proven to be better than that of the previous art in that the tube ends are sealed preventing the hot water, the heating medium, from leaking outside in a condition in which a part of the coated electric heating wire extends out of the tube, without the use of an adhesive for bonding to achieve a sealing effect.

However, as the coated electric heating wire protruding from the hot water tube is thin and weak compared to the power line, it is susceptible to damage during a heating system installation. Safety of the sealing device is further affected under the condition where a coated electric heating wire and a power line are jointed together outside the tube, where a hot water tube is fixed to a wall or a floor, or where if it is rubbed or scraped against a hole on the crown nut fixed at the end of the hot water tube or pulled hard.

These problems are common challenges that have to be tackled with the prior arts.

SUMMARY OF THE INVENTION

The objective of the present invention is to provide a means to facilitate inserting an electric heating wire into a hot water tube and carrying it along inside of the entire length of a hot water tube using a ball-type guide member firstly by through-fitting a guide tube that directs lengthwise the water pressure generated by a pump from one end to the other end of the hot water tube lying in a zig-zag pattern under the floor to be heated and secondly by properly inserting the ball-type guide member attached with the electric heating wire into the hot water tube, the electric heating wire inserted through a guide hole provided on a side of the guide tube at a specific slant so that the tube's inner sectional space is effectively kept sealed by the ball-type guide member.

Another objective of the present invention is to provide an apparatus comprising a guide tube capable of directing the pump generated water pressure lengthwise in the tube and further being provided with a guide hole designed to allow passage at a slant of the coated electric heating wire toward the hot water tube so that the ball-type guide member, when forced by the water pressure, is moved along the entire length in the hot water tube, carrying with it the coated electric heating wire.

In the method embodied by the present invention for a means to insert a coated electric heating wire into a known hot water tube lying in a zig-zag pattern with occasional bents under the floor of a room to be heated, the water pressure generated by the pump and directed through the guide tube is made to work lengthwise along the hot water tube shaft from one end of the hot water tube line to the other end. Then, the other end of the tube line is linked to a water reservoir connected to the pump's suction tube so that when the water pressure from the pump reaches from one end to the other of the hot water tube line, the water coming out the other end returns to the water reservoir. The fluid being used for inserting into and carrying inside the hot water tube is a heat radiating medium that initially radiates heat in the hot water tube and the type of such a heat radiating medium is chosen from among such known heat medium as water, anti-freeze, harmless liquid, etc. The required water pressure is supplied by the pump from the water reservoir toward the guide tube for initial insertion of the coated electric heating wire into hot water tube and the fluid being filled as such inside the hot water tube line is used as a heating medium once the coated electric heating wire has been laid.

According to the method embodied by the present invention above, as the water pressure generated by the pump is supplied in the direction of the tube run through the upper part of the guide tube, the traction force of the fluid is effectively utilized in moving the ball-type guide member in lead of the coated electric heating wire, resulting into lessened water pressure as compared to that of the previous model. The water pressure of about 10~20 kg/cm$^2$ is preferred. A pump can be operated at a higher pressure level, but it can result into an excessive energy consumption as well as higher cost of construction.

A ball-type guide member made of synthetic resin material and having a diameter corresponding to that of the inner diameter of the hot water tube is inserted into the hot water tube line and said ball-type guide member is attached with a coated electric heating wire that had been inserted through a guide hole provided at the side of said guide tube. Since the ball-type guide member is always effectively sealing the cross sectional area inside the hot water tube line, the ball-type guide member passes from one end to the other by easily making its way through any bents of the tube line, pulling meanwhile the coated electric heating wire along with it.

Thus, the electric heating wire is inserted into and laid out over the entire length inside the hot water tube line as the ball-type guide member is moved along.

Although most of the trapped air inside the hot water tube line is discharged in the course of ball-type guide member's movement within the tube, the pump can be run further to achieve more bleeding of the air.

The method as embodied by the present invention differs from the prior method in that in the present method the water pressure is directed, by the guide tube pipe-fitted to the outlet tube of the pump, in the shaft direction of the hot water tube line so that the water pressure works lengthwise beginning from one end of the hot water tube line and that the coated electric heating wire is inserted in line with the direction of water flow through a guide hole provided on the guide tube.

Further, as the ball-type guide member that pulls with it the coated electric heater wire is made in a spheric shape for effective sealing of interior sectional area of the hot water tube, the water pressure with little chance of pressure loss can be effectively utilized to render an uninterrupted forward movement of the ball-type guide member even in bents of the tube.

Thus, the system renders an advantage of rapid and efficient insertion of a coated electric heating wire inside the extended hot water tube line.

In the apparatus of the present invention, the guide tube designed to guide the pump generated water pressure lengthwise to the hot water tube line is pipe-fitted between one end of the hot water tube and the outlet pipe of the pump, and further a guide hole of a size tight enough only to let the electric heating wire pass is drilled at a side of the guide tube at a slant of 10~30 degrees so that the electric heating wire is fed at a slant into the tube from outside. Also, the ball-type guide member which pulls the electric heating wire along is made of synthetic resin in a spheric shape and has a diameter equivalent to the inner diameter of the hot water tube, rendering an ability to effectively seal the interior sectional area of the hot water tube at any location in its movement inside the hot water tube.

In the present invention, the ball-type guide member is forced forward by the water pressure being directed in the direction of the hot water tube shaft with the pressure acting upon a half of the entire surface of the ball-type guide member, enabling it to successfully pass any bents of the tube line.

There is no restriction to the slant angle at which the electric heating wire is required to be inserted from a side of the guide tube, but the smaller its angle to the shaft of the guide tube is, the less its tractive resistance is. Also, it becomes easier to push in the coated electric wire from outside of the guide tube during the initial insertion stage.

The structural simplicity and satisfactory function of the present apparatus allow for a more economical and efficient insertion process of a coated electric wire into hot water tube as compared to the traditional models.

The coated electric heating wire specified in the present invention differs from the ordinary one made of chrome steel and is a special coated electric heating line capable of generating heat of about 60~80° C. and a known coated electric heating wire for heating a room by heating the liquid in the hot water tube by the heat the liquid radiates.

In the present invention, one end of the hot water tube is linked to the outlet port of the pump and the other end is linked to the water reservoir connected to the inlet port of the pump. Therefore, there is no liquid leakage from the water reservoir when the pump is operated for insertion process of the electric heating wire into a hot water tube line laid out under a floor of a room, providing a neat working environment.

Further, in the present invention, as a means to close the end of the hot water tube, a sealing plug with an electric heating wire already inserted is fitted into a plug connected to the hot water tube and tightened with a crown nut for air-tight sealing of the tube end. Provided inside the sealing plug made of silicon material and having a cylindrical shape, whose thickness grows toward its top, are two wire channels with upper holes of a larger diameter for support and fixation of couplers, in which a power line and an electric heating wire are respectively connected, and lower holes of a smaller diameter for support and passage of an electric heating wire. The couplers holding the power line and the coated electric heating wire in contact are situated inside the sealing plug which is designed to be inserted into a plug fined into the hot water tube end. A crown nut and a cap is respectively fixed thereafter. Electric power is supplied to the coated electric heating wire through the temperature sensor mounted at a side of the hot water tube.

The sealing plug of the present invention, when inserted, is seated tightly against the inner surface of the plug and exhibits excellent sealing effect for the heating medium filling the hot water tube. As the couplers of the power line and the coated electric heating wire are situated inside the dual-hole channel formed within the sealing plug, each power line and electric heating wire is satisfactorily protected by the sealing plug and by the plug from damage or cut through rubbing or scraping. The power line is also strong enough to endure ordinary interference during installation or normal operation.

As the electric power is supplied over a single string electric heating wire via the temperature sensor, a power supply over two-string coated electric heating wire at the initial stage of operation for rapid heating can be automatically switched to a single-string electric heating wire power supply mode when the temperature of the heating medium reaches 60° C. by the function of the temperature sensor for safe operation. Thus, the present invention is designed to allow for simplicity in structure and enhance the sealing effect on the tube end, safe power line connectivity and structural safety.

DESCRIPTION OF SYMBOLS IN MAJOR ELEMENTS OF THE DRAWINGS

1: sealing plug, 2: hot water tube, 2A: guide tube, 3: plug, 3C: pump, 4: water reservoir, 5: ball-type guide member, 6, 6a: coated electric heating wire, 1h: wire channel, 1h': upper wire hole, 1h": lower wire hole, 25: temperature sensor, 3: plug, 4: crown nut, 5a: upper hole on the cap, 5d: cap, 7: thermostat, e1, e1': power line, Ca, Cb: connecting tube, Cd: wire coupler.

DETAILED DESCRIPTION OF THE PREFERRED EMBODIMENTS

Figure 1:
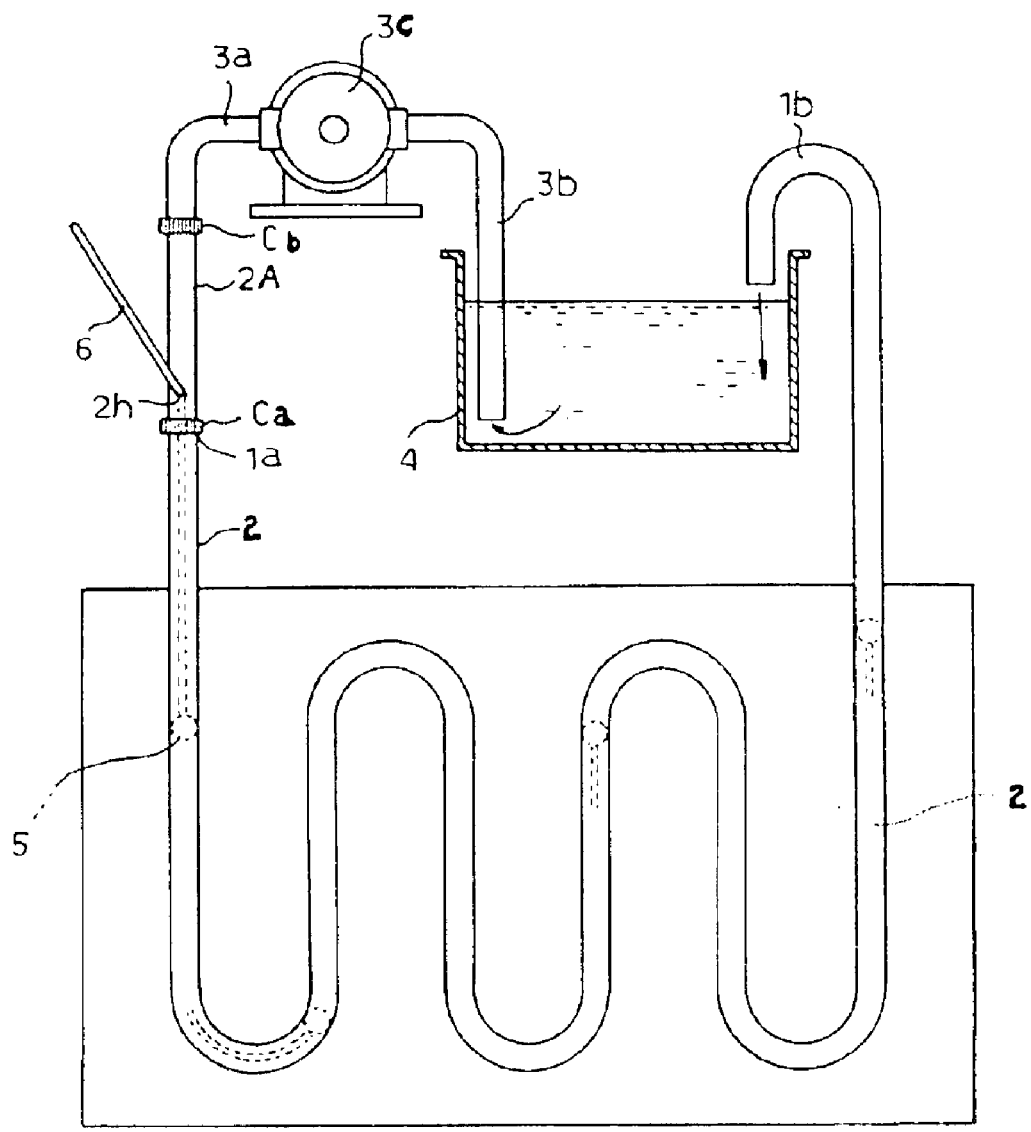
FIG. 1 illustrates a coated electric heating wire inserted into a hot water tube.

As illustrated in FIG. 1, one end (2) of the hot water tube laid out under the floor of a room to be heated is pipe-fitted to the outlet tube (3a) of the pump (3C) through the guide tube (2A) and the other end (1b) of said hot water tube (2) is routed to the water reservoir (4) provided with the inlet tube (3b) of said pump (3C) to allow the water pressure generated by the pump (3C) to run along the shaft center from one end (1a) to the other end (1b). A ball-type guide member (5) made of synthetic resin and having a diameter equivalent to that of the inner diameter of the hot water tube is inserted into the hot water tube (2) and a plural number of coated electric heating wires (6) are inserted through a guide hole (2h) drilled at a specific slant on a side of said guide tube (2A) and then connected to a core wire (5a') of said ball-type guide member (5). As said ball-type guide member (5) is effectively sealing the interior sectional area of the hot water tube (2), the ball-type guide member (5) moves lengthwise from one end of the hot water tube (2) and reaches the other end when required pressure is applied by operating the pump.

The water pressure in this application is not restricted but a pressure of about 10~20 kg/cm2 is sufficient to serve the goal, and the pump (3C) operation is only required up to the point where the ball-type guide member exits the other end of the tube and there is no need to change the water pressure from the pump even if the length of the hot water tube varies. In other words, it is economically beneficial to achieve complete passage of the electric heating wire (6) through the tube line, led by the ball-type guide member, with a minimum level of water pressure. The inserting angle for the coated electric heating wire is not restricted either, but a slant of about 10–30 degrees is preferred.

The pump (3C) will be run further after the coated electric heating wire (6) has passed through the hot water tube (2) for complete bleeding of the air in the hot water tube. Then the processes of further sealing both ends of the hot water tube (2) thereafter and connecting the coated electric heating wire (6) to a power supplying unit are carried out as in the known method.

Figure 2:
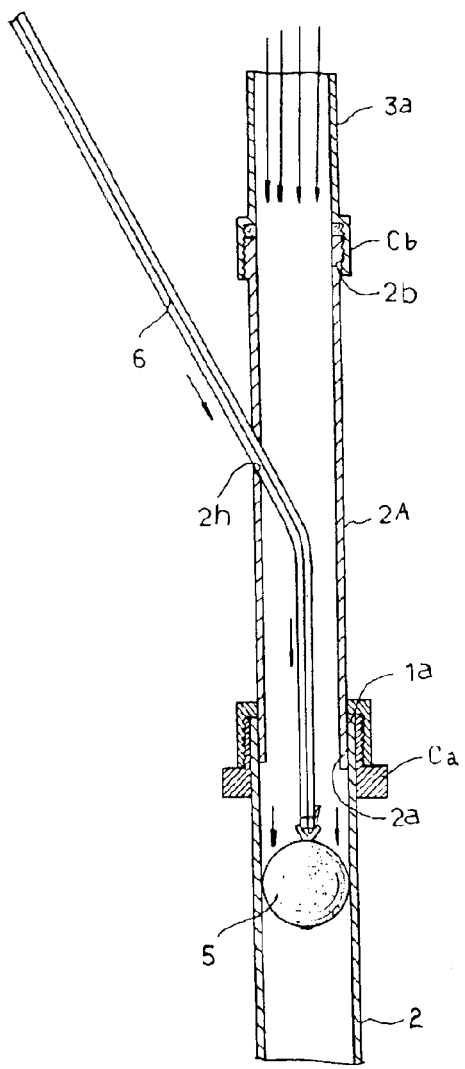
FIG. 2 illustrates a sectional view of an apparatus used in inserting a coated electric heating wire into the hot water tube of the present invention.
Figure 3:
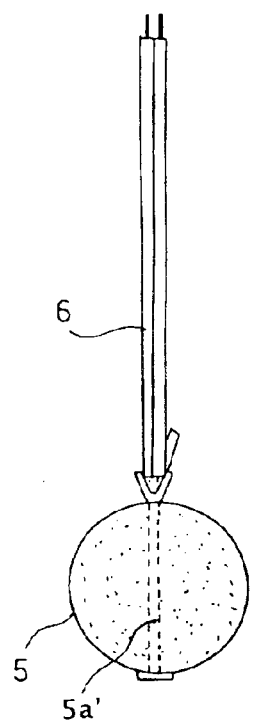
FIG. 3 illustrates a ball-type guide member attached with an electric heating wire.

As illustrated in FIG. 2, the apparatus of the present inventions comprises a guide tube (2A) pipe-fitted between one end (1a) of a hot water tube (2) and outlet tube (3a) of a pump (3C) and a guide hole (2h) having a size tight enough only to allow for passage of a plural number of coated electric heating wires (6) and drilled on a side of said guide tube (2A) with a slant, preferably a slant of 10~30 degrees, to the guide tube (2A). Further, a coated electric heating wire (6) being inserted through said guide hole (2h) of said guide tube (2A) is connected to a ball-type guide member (5) made of synthetic resin, i.e. silicone resin or reinforced foam resin, and having a diameter equivalent to inner diameter of the hot water tube (2) and a core line (5a') running through the center of said ball-type guide member (5). After the ball-type guide member (5) attached with the coated electric heating wire is inserted into the hot water tube (2), the bottom (2a) of the guide tube (2A) is pipe-fitted to one end (1a) of the hot water tube (2) with a suitable connecting pipe (Ca) and the top (2b) of the guide tube (2A) is pipe-fitted to the outlet tube (3a) of said pump (3C) through a suitable connecting pipe (Cb).

The water pressure generated by the operation of the pump (3C) pipe-fitted to the guide tube (2A) works lengthwise to the hot water tube (2) through the guide tube (2A) and the ball-type guide member (5) is passed through the hot water tube line from one end to the other pulling along with it the coated electric heating wire (6).

As the ball-type guide member (5) has a spherical shape, it is capable of effectively sealing on continuous basis the sectional space of the hot water tube (2), enhancing the utility rate of fluid energy with little likeliness of losing water pressure and allowing movement of the ball-type guide member within the tube line with a relatively lower water pressure. Because of its spheric shape, the ball-type guide member (5) is always directed lengthwise along the hot water tube line regardless of the angle at which the water pressure is directed toward the spheric surface, and the guiding function of the surface of the ball-type guide member and the inner wall of the hot water tube enables smooth passage of the ball-type guide member through the bents of the hot water tube (2) without being halted on the way. Also, it will be helpful for smoother passage of the ball-type guide member (5) and pulling of the coated electric heating wire within the hot water tube if the coated electric heating wire is given a push from outside of the guide tube (2) to facilitate its passage through the guide tube (2A).

The structure of the apparatus of the present invention is simple and has few potential breakdown components and just about anyone can use the apparatus and install a water heating system as no special technique is required.

To seal the ends of the hot water tube line, a sealing plug with a coated electric heating wire inserted is fitted into a plug connected to the hot water tube and tightened with crown nuts to seal one end of the hot water tube. Formed inside the sealing plug (1) made of silicone material, whose thickness gradually grows toward its top, is a wire channel (1h) comprising an upper wire hole (1h') of larger section for reception and fixation of a wire coupler (Cd) on which a power line (e1) and a coated electric heating wire (6) are connected and a lower wire hole (1h") of a smaller diameter, through which a coated electric heating wire (6a) is tightly passed with no allowance. The sealing plug (I) is forcibly inserted through the inside of the plug (3) and a crown nut (4) is fitted to the upper part (3a) of the plug (3) with screws. A hemispheric cap (5d) is fitted to the upper part (4a) of the crown nut (4) and the overall constitution is designed in such a way that the power line (e1) is directed toward the upper hole (5a). Also, on a side of the hot water tube (2) pipe-fitted to the lower part of said plug (3), a temperature sensor (2S) is fixed and a power line (e1') is connected to the coated electric heating wire through the temperature sensor (2S).

Figure 4:
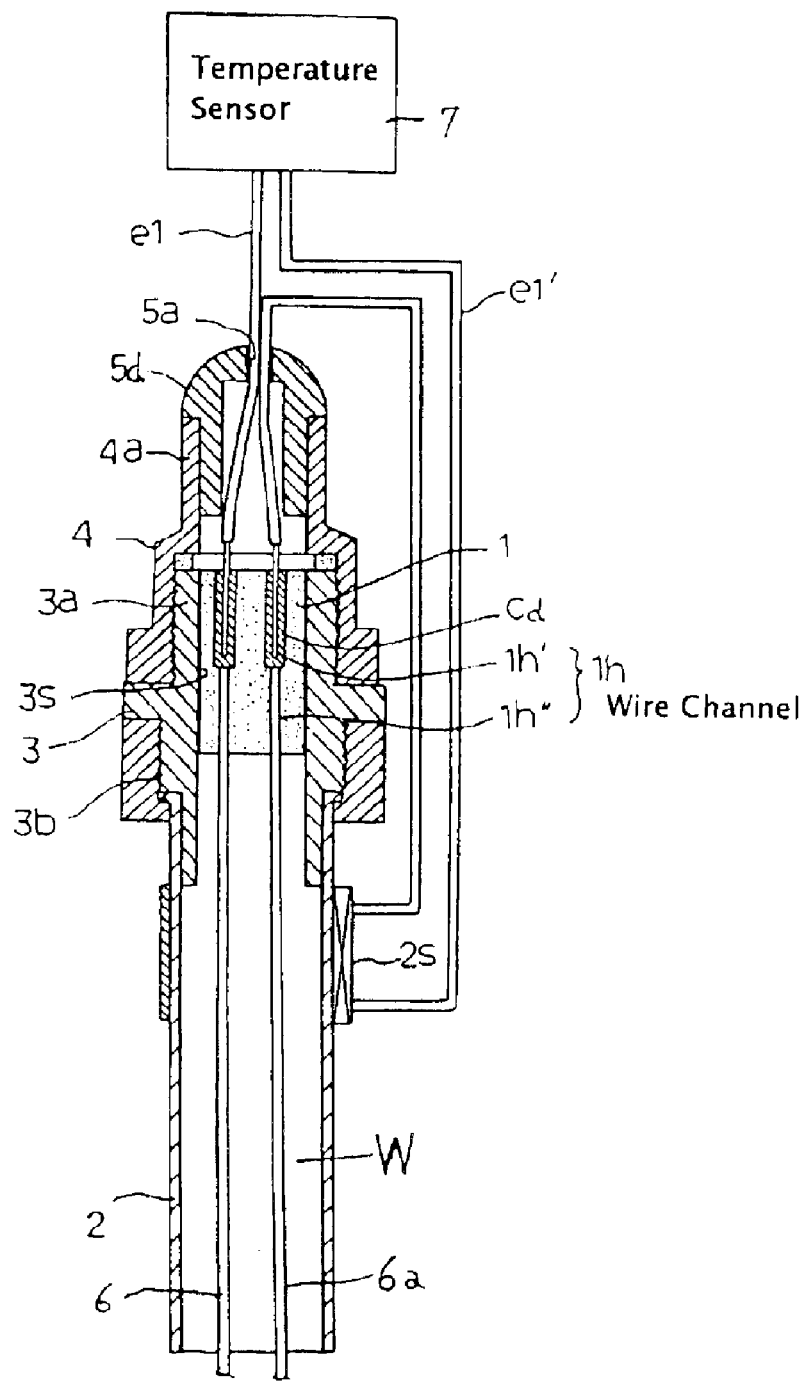
FIG. 4 is a sectional view of the present invention.
Figure 5:
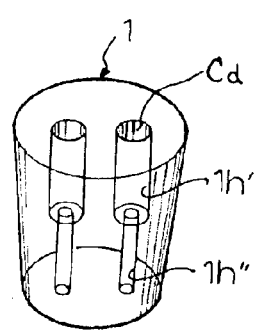
FIG. 5 is a perspective view of a sealing plug of the present invention.

FIG. 4 illustrates a cross section of a sealing plug in one end of the hot water tube and the construction of the other end of the tube line is omitted as both sealing plugs are identical.

Figure 6A:
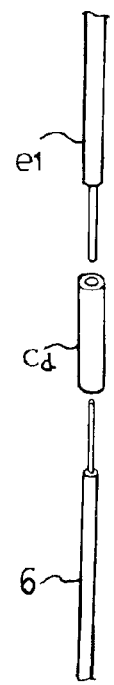
FIG. 6(a) illustrates a wire coupler prior to the coupling of a coated electric wire and a power line.
Figure 6B:
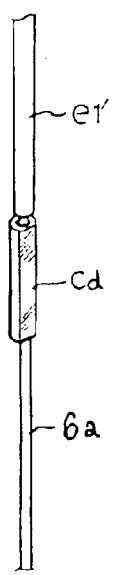
FIG. 6(b) illustrates a wire coupler connecting an inserted coated electric heating wire and power line.
Figure 7:
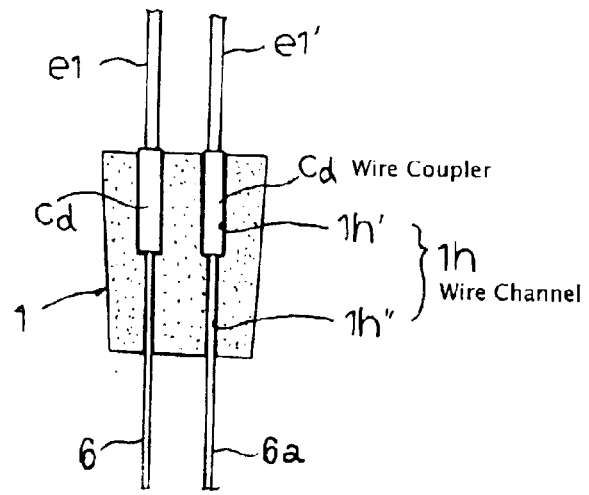
FIG. 7 is a sectional view of the sealing plug with an inserted electric heating wire and a power line.

In the present invention, the coated electric heating wire is passed through both ends of the hot water tube line (2), a quantity of heating medium (w), a typical kind of which is anti-freeze, is filled inside the hot water tube line (2) and then, as illustrated in FIG. 4, the lower part (3b) of the plug (3) is secured by pipe-fitting to both ends of the hot water tube line (2) and further, as illustrated in FIGS. 6(a)(b), a coupler (Cd) linking together the power line (e1)(e1') and the coated electric heating wire (6)(6a) is plugged into the upper hole (1h') of the sealing plug (1), while the coated electric heating wire (6)(6a) is passed tightly through the lower hole (1h") of the sealing plug (1). Finally, the sealing plug (1) is forcibly inserted into said plug (3).

The inserted sealing plug (1) is compressed against the interior wall of the plug (3) and as the contact level of the exterior surface of the sealing plug (1) and the interior wall (3S) of the plug (3) is very tight, the sealing plug alone will achieve a tight sealing of each end of the hot water tube line (2). Crown nut (4) is fixed to the upper part (3) of the plug (3) into which the sealing plug (1) is inserted and a cap (5d) is fitted to the upper part of the crown nut (4), to allow the power line (e1) being directed toward the upper hole (5a) of the cap. Thus, the coupler (Cd) for the power line and the coated electric heating wire is situated inside the hole (1h) of the sealing plug (1), and safeguarding of the wire coupler, the power line and the coated electric heating wire is achieved by means of the sealing plug (1), the plug (3) and the crown nut (4).

A power line (e1') linking a coated electric heating wire is routed to a temperature sensor (2S) of the hot water tube (2), all the power lines being connected to the thermostat (7).

According to the method of the present invention, as the water pressure generated by the pump is directed forward along the tube's shaft core, the water pressure being supplied works lengthwise and in the meantime the ball-type guide member capable of effectively sealing the sectional space inside the hot water tube is smoothly passed through the tube line by the work of the water pressure, resulting in an efficient laying out of the coated electric heating wire throughout the long hot water tube line.

As both ends of the hot water tube line are connected to water reservoir, one end being connected to the water reservoir through a guide tube and the tubes of the thermostat, no fluid leaks out during pumping operation for insertion and carriage of the coated electric heating wire into and through the hot water tube line, providing a favorable working condition for installing the hot water tube in the room to be heated.

The construction of the present invention having a guide hole for inserting the coated electric heating wire drilled at a specific slant on a side of the guide tube that directs lengthwise the water pressure from the pump through the hot water tube and a ball-type guide member of a diameter equivalent to the inner diameter of the hot water tube renders simplicity of construction and lower cost. Further, as the lengthwise movement of the ball-type guide member within the hot water tube line is assured once the pump is run, just about anyone without special skill is able to handle the apparatus and achieve a rapid insertion of the electric heating wire.

Also, the apparatus and method embodied by the present invention has solved the technical problems posed by the traditional method where a guiding plate would often become stuck in the middle of the process, and has rendered a means to enable a convenient insertion of an electric heating wire into a hot water tube.

Since a wire coupler connecting the power line and the coated electric heating wire is placed inside the wire channel within a sealing plug, the sealing plug being fitted into a plug and further tightened with a crown nut, the level of adhesion between the sealing plug and the plug is enhanced, ensuring a precise sealing of the hot water tube ends and safeguarding the wire coupler for the power line and the coated electric wire by the work of the sealing plug itself, the plug and the crown nut for improved integrity and safety of somewhat thin and weak coated electric heating wire in installing.

And, the structure is simple and solid and convenient as well in handling. It is more safe, convenient and useful compared to the conventional system.

I claim:

1. A method of inserting an electric heating wire into a hot water tube and carrying it through inside of the hot water tube, wherein one end of the hot water tube laid beneath the floor of a room is pipe-fitted, via a guide tube, to the outlet tube of a pump and the other end of said hot water tube is led into a water reservoir provided with an inlet tub of said pump, and a ball-type guide member attached with plural coated electric heating wire is inserted through a guide hole provided on a side of said guide tube in such a way as to keep the internal sectional space of the hot water tube sealed, and wherein the ball-type guide member is continuously pushed forward inside the hot water tube by the water pressure being generated by the pump, pulling along with it the electric heating wire.

2. A method according to claim 1, wherein the water pressure from the pump being applied to the guide tube connected through pipe-fitting to the hot water tube is 10~20 kg/cm$^2$.

3. An apparatus for inserting a coated electric heating wire into a hot water tube, wherein a guide hole of a size to allow a passage of one or a plurality of coated electric heating wire is drilled at a specific slant on a side of a guide tube connected to one end of the hot water tube and an outlet tube of the pump, and the ball-type guide member designed to pull said electric heating wire is formed in a spheric shape whose diameter is equivalent to the inner diameter of the hot water tube and wherein said coated electric heating wire is connected to a core wire running through and extending out of the center of the ball-type guide member that helps lay out the coated electric heating wire throughout the entire interior length of the hot water tube line by pulling it along while being pushed forward by the water pressure generated by the pump and being directed to the guide tube.

4. An apparatus according to claim 3, wherein the slant of the guide hole drilled on a side of the guide tube and designed to pass the electric heating wire is 10~30 degrees to the guide tube.

5. A sealing apparatus for sealing an end of a hot water tube with a sealing plug fitted into a plug with coated electric heating wires passing through the sealing plug, wherein a wire channel is formed inside the sealing plug of cylindrical shape, in which a wire channel is provided with an upper hole of larger bore and a lower hole of smaller bore, the upper hole being used for supporting and fixing a wire coupler connecting a power line and a coated electric heating wire and the lower hole being used for passing tightly with no allowance the coated electric heating wire, and wherein said sealing plug is forcibly inserted into a plug, on whose upper portion a crown nut is fixed. On the upper portion of the crown nut, a semispherical cap is connected in such a way as to allow a part of the power line to be extended out.

6. A sealing apparatus according to claim 5, wherein a temperature sensor is fixed to a side of a hot water tube which is linked through pipe-fitting to the lower portion of a plug and one power line from a plural strands of a power line is connected to a coated electric heating wire via a temperature sensor.

7. A sealing apparatus according to claim 5, wherein wire channels formed in the sealing plug of a cylindrical shape with its thickness growing larger toward its end has an upper hole of a size suitable for accepting and supporting within a wire coupler connection of a power line and a coated electric heating wire and a lower hole of a size suitable for passing a coated electric heating wire with no allowance.

8. A sealing apparatus according to claim 5, wherein a wire coupler connecting a power line and a coated electric heating wire is inserted into a wire channel of a sealing plug fitted into a plug so that the power lines and coated electric heating wires can be protected and maintained by the sealing plug, the plug, and the crown nut.

* * * * *